United States Patent [19]
Ogiso

[11] 3,907,962
[45] Sept. 23, 1975

[54] METHOD OF PREPARING A FILTER MEDIUM FOR THE FILTRATION OF MOLTEN ALUMINUM OR A MOLTEN ALUMINUM ALLOY

[76] Inventor: Koichi Ogiso, 25 Tashiden, Daito, Osaka-fu, Japan

[22] Filed: Feb. 17, 1972

[21] Appl. No.: 227,303

Related U.S. Application Data

[63] Continuation-in-part of Ser. No. 842,294, July 16, 1969, abandoned.

[52] U.S. Cl. ................. 264/332; 75/68; 210/69; 210/496; 210/510; 266/39; 264/43; 164/119
[51] Int. Cl. ............................................. C04b 35/60
[58] Field of Search ............ 75/68, 94; 210/69, 496, 210/504, 510; 264/332; 266/34 R, 34 T, 39

[56] References Cited
UNITED STATES PATENTS
3,524,548   8/1970   McDonald et al. ................. 210/496

Primary Examiner—Gerald A. Dost
Attorney, Agent, or Firm—George B. Oujevolk

[57] ABSTRACT

A method of preparing a filter medium for the filtration of molten aluminum or a molten aluminum alloy comprising the steps of using more than two halogenide compounds, of which at least one halogenide is selected from the group consisting of compounds of sodium fluoride, potassium chloride, silver chloride, potassium fluoride and sodium nitrate, and of which the second halogenide is selected from the group of compounds having a melting point of more than 1000°C consisting of calcium fluoride, magnesium fluoride, aluminum fluoride, barium chloride, cryolite, and cerium fluoride and mixtures thereof; heating said compounds until they are molten and then mixing thoroughly with some agitation to obtain a homogeneous melt and subjecting the thus obtained melt to a molding step.

11 Claims, 6 Drawing Figures

GRAPH I

METHOD OF PREPARING A FILTER MEDIUM FOR THE FILTRATION OF MOLTEN ALUMINUM OR A MOLTEN ALUMINUM ALLOY

BACKGROUND OF THE INVENTION

This application is a continuation-in-part of U.S. patent application Ser. No. 842,294 filed on July 16, 1969 and now abandoned.

This invention relates to the purification procedure of molten metal. Heretofore, for this purpose gas blowing methods, treatment with various fluxes, and methods of filtration by glass wool or ceramics have been widely used. However, these treatments emphasize mechanical, but not physical chemistry characteristics.

This invention relates particularly to a novel treatment of molten metal based on physical chemical properties, especially the interfacial phenomenon and also provides for a filtering medium and a filtering method. Molten metal contains oxides as impurities, and nonmetallic inclusions produced by partial separation arising from furnace walls and foundary tools, as well as gaseous impurities such as hydrogen diffused through the oxide film, and, it is difficult to obtain normal molten metal without eliminating the impurities. The oxides most often included in the impurities are very stable ionic crystals and always porous. Therefore, the polar gases diffused into molten metal are absorbed on the surface of the oxide and diffuse through the porous inner part. Abnormal molten metal has numerous interfaces of molten metal and impurities and also interfaces of oxides and gases in impurities.

THE PRIOR ART

It is well known that to obtain a high purity aluminum metal by the method wherein molten aluminum is filtered by using a filter medium which is made of inert and fire-resistant materials, such as aluminum oxide, and carbon element substances, and chamotte substance, and encased in a suitable vessel, on filtering, the impure materials contained in the aluminum metal are usually filtered off, but in this case, the interfacial tension between the molten aluminum and the filter medium is so large that the following two defects are to be noted owing to the pore size of the filtrate path which is controlled by regulating the size of the filter medium substance used. The first defect is that it takes a long time to filter through the path pores which are a little smaller than those usually used, and the second defect is that the conventional filtering processes are unsatisfactory if the path pores are a little larger than the conventional ones, because the impurities of tiny particles readily pass through the filter medium pore paths. And thus, these defects prevent the proper industrial use of conventional filters.

Considering the purifying effect on the industrial process, the filter medium should be made of substances which will have as small an interfacial tension as possible between the molten metal and filter medium. Now, according to the present invention, there is provided a filter medium which fulfils this purpose. In the production process of the medium according to the present invention, some fusible materials such as sodium chloride, potassium chloride, potassium fluoride, silver fluoride, and sodium nitrate may be used.

On the other hand, it is a noticeable fact that there are some men skilled in the art who support the probability of the ready removal of impurities, i.e., the oxide compounds which are contained in aluminum metal, from the molten aluminum when the sum of the interfacial tension of alumina/flux system and that of aluminum/flux system has become smaller than the interfacial tension of alumina/aluminum system.

In the technical field it is well knwon that there exists the phonomenon of gas absorption of the oxide substances in the molten metal phase, and this phonomenon is understood as a physical one in which non-polar gas components are absorbed into the substances of ion crystal structure, wherein the absorption energy is generally rather small. Therefore it is possible to suppose that by giving some other type of larger energy onto the interfacial system, and by breaking up the boundary surface or the equilibrium state between surfaces, some absorption relating to the gas component would be generated by some macro-physical decomposing reaction relating to the gas absorbed material.

Regarding conventional processes for removing impurities, such as oxide materials which are dispersed in the molten metal, it is easy to filter off large sized impurity particles by catching them on the filter medium layer, but it is not so easy to filter off the impurities of small sized particles, because small particles of impurities pass through the pores in the medium layer without hindrances. This is the bottleneck of the filteration process. To solve such a problem of the conventional filtering process it is necessary to use some filter medium which has superior physical and chemical properties to absorb the impurities of the ultra-tiny particles. And thus, it is preferable to use chemically and physically active fire-resistant substances than to use inert fire-resistant substances in order to obtain a better absorbing efficiency from the filter medium, and consequently, a better filtering effect.

SUMMARY OF THE INVENTION

This invention is achieved by the knowledge of the characteristics of interfaces in molten metal and is based on a filtering material which absorbs or combines the impurities together with the reduction of interfacial energy produced in the interfacial phase and the decrease of interfacial force, and also is based on a method to provide impact energy by means of the destruction of interfaces between oxides and gases by the reduction of interfacial energy. A filtering bay is provided for the place to carry out this invention.

According to the present invention, materials which contain sodium chloride, potassium chloride, or potassium fluoride may be used as a suitable filter medium. Thus, the interfacial surface tension which is produced by both filter medium and the molten metal to be filtered becomes small. The filter medium materials of the present invention which contain ion crystals of sodium compounds, calcium compounds, or lithium compounds are effective to absorb hydrogen gas which is dispersed in the substrate molten aluminum metal. In this case it may naturally be considered that the metal element of the compound compositions of the substance medium is converted, by touching the hydrogen gas generated in the molten metal phase, into some compounds such as sodium hydride, calcium hydride, and lithium hydride. During the metal filtering process the quantity of the active compound material in the filter medium has considerable influence on the impurity removal properties of the filter medium.

In one aspect of the present invention the chemically related materials with a melting point of more than 1000°C, such as metal halides, e.g., barium fluoride ($BaF_2$), calcium fluoride ($CaF_2$), cerium fluoride ($CeF_3$), cryolite $Na_3AlF_6$), magnesium fluoride ($MgF_2$), and aluminum fluoride ($AlF_3$) which have desirable properties of being able to resist against wearing out, or being extinguished off in the course of use, and to be active to the impurities in the molten aluminum metal, should also be contained in the filter medium as constructional ingredients. It is further preferable that the filter medium have some compound material such as carbon compound, nitrogen compound, boron compound, or silicon compound, in order to acquire the permanency of the filter medium for a long lasting use. A filter medium which is cast by conventional molding methods and contains usual materials or usual materials with some binding material is apt to disintegrate and be extinguished during use. This means inferior filtering efficiency. On the other hand, according to the present invention, the material of the filter medium comprises of at least two components selected respectively from the following two groups, i.e., one is a group which contains sodium chloride, potassium chloride, potassium iodide, silver chloride, sodium nitrate, and another is a group which contains compounds with a melting point of more than 1000°C, so as to get a filter medium which is satisfactory after being used many times without failure, and able to resist melting or wearing away, and having a superior filtering effect.

Another aspect of the present invention is that the filter medium material may contain some halide compound of either sodium metal, calcium metal, or lithium metal which has superior properties to absorb hydrogen. According to the present invention it is preferable to use one or more compounds of carbon, nitrogen, boron, and silicon-containing compounds, and the materials which contain more than two kinds of metal halides as manufacturing raw materials for the filter medium preparation.

One of the main objects of the present invention consists in providing a filter medium of superior quality wherein the constructional material of the medium comprises of at least more than two kinds of the aforesaid metal halides and any one or more than one compounds selected from the group of carbon, nitrogen, boron, and silicon containing compounds, and the manufacturing procedure of the filter medium is effected by melting the above mentioned raw constructional material at a high temperature, blending and mixing the molten mixture thoroughly with mild agitation and pouring the molding material thus obtained into a mold at atmospheric pressure to obtain a desired filter medium. The molding mechanism resembles the casting mechanism used for metal alloy casting.

Yet another object of the present invention is to provide a filter medium of superior and improved permanency to resist against wear after multiple use. To attain this purpose the filter medium may be manufactured by using either of the following three constructional molding raw materials, i.e., the foregoing metal halide substances; a mixture of any one or more than one compounds selected from the group consisting of carbon, nitrogen, boron and silicon containing compounds and the foregoing halides; or a mixture of any one or more of the group of materials consisting of carbon, nitrogen, boron and silicon containing compounds. These halides and the inert and fire-resistant substances, such as ceramics, glass wool, carbon fiber, and occasionally, some suitable metal powder or metal particles may be added to the above mentioned cases.

The composition of the molding materials for the filter medium of the present invention are as follows:

| Ingredients | Content (%) based on the mixture weight |
|---|---|
| Composition Example 1 | |
| Calcium fluoride | 10 – 40 |
| Borax | 5 – 15 |
| Magnesium fluoride | 30 – 60 |
| Man-made cryolite | 5 – 15 |
| Lithium carbonate | 5 – 15 |
| Sodium chloride | 5 – 15 |
| Composition Example 2 | |
| Barium fluoride | 30 – 60 |
| Potassium chloride | 10 – 30 |
| Sodium chloride | 5 – 20 |
| Potassium fluoride | 5 – 20 |
| Lithium chloride | 5 – 20 |
| Composition Example 3 | |
| Potassium fluoride | 20 – 40 |
| Sodium chloride | 20 – 40 |
| Alumina | 10 – 30 |
| Composition Example 4 | |
| Calcium fluoride | 30 – 50 |
| Lithium chloride | 10 – 20 |
| Sodium nitrate | 10 – 20 |
| Titanium metal powder | 5 – 10 |

The raw materials of each example are heated to about 1000°C–1400°C, i.e., to their melting points with thorough stirring after the substances become liquid. Each composition thus obtained is cast into a mold of graphite with a rapid cooling treatment so that such disadvantageous effects, such as segregation phenomenon, or some phase separation phenomenon between the ingredients does not take place.

The composition of Example 1 comprises metal halides and a carbon compound. The composition of Example 2 comprises metal halides only. The composition of Example 3 comprises metal halides and a ceramic substance. The composition of Example 4 comprises metal halides, a nitrogen compound and metal powder.

The filter medium made of each composition in Examples 1 to 4 has a striking permanency and endures against wearing out in severe circumstances of high temperatures of the molten aluminum phase.

Each filter medium made of the composition in Examples 1, 3 and 4 has a specific gravity of value range of from about 2.4 to 2.6, and these mediums can be conveniently used for the metal filtering process by putting them in a piled mass form between two porous filter walls in the molten aluminum metal. On the other hand, the filter medium made of the mixture of Example 2 has a specific gravity of about 3.0 to 3.2, and can be conveniently used for the process by putting the medium in a piled mass form on a porous filter plate wall at any place in the molten aluminum metal, or on a same kind of plate wall positioned at the bottom side of the molten metal liquid to be filtered.

The characteristics of the filtering material of this invention are its high ionic bonding force, the increasing of the ionic bonding force in the molten metal, its entire non-destructiveness by shocks, and to exclude binders such as ethane hexachloride to melt mold the composition such as metal halogenides, and to obtain stable crystals for long hours and structurally homogeneous and isotropic to mold in high-cooling of the molten product. This provides very characteristic mechanical properties.

The filtering material of this invention continuously produces a very stable viscous molten salt film on the surface of the filtering material.

The film reduces the interfacial energy between molten metal and impurities and decreases the interfacial tension and also absorbs the impurities by the wetting. This molten salt film is slightly ionized by the decrease of crystallinty and continuously generates a gaseous product at a very slow speed.

This gaseous product eliminates gaseous impurities such as hydrogen.

The gaseous product and free ionized atoms generate the gaseous atmosphere or the thin molten compound film with metal on the surface of molten metal, and prevent the contact of the atmosphere with the molten metal and avoid oxidation of the molten metal for long hours and simultaneously destroy the oxide film and keep the metal in a normal state by reduction of the diffusion into the oxide layer.

The filtering material of this invention is odorless and smokeless and is effective for the purification procedure for more than 100 work hours with one unit, and by using it, stable molten metal is obtained.

The filtering material containing powder or a mass of fire and heat resistant materials, metals and various fibers such as glass fiber or carbon fiber are used to mold low melting point compositions as shown in the Composition Table and to mold materials of high specific gravities than molten metal.

This procedure is also used to produce layers of metal halogenide salts on the surface of the mass of fire and heat resistant materials and metals.

In filtering materials including the above mentioned substances, the surface crystals of the molded materials are activated gradually to ionize ions or liberate gases; there is a tendency of the said filtering material to shrink in suface area. However, the existence of heat and fire resistant substances which are exposed at their existing positions in said filtering material will protect the surface area from being reduced and the filtering passes from being expanded, so that the impurities can be qualitatively filtered.

Fibers also used for the same reasons showed a characteristic filter effect.

Furthermore, the molded materials including fibers have improved mechanical strength and it becomes possible to obtain thin and flat molded materials. It is necessary to wash the molten metal with continuously produced gases and ions by the activation of the filtering material having a greater specific gravity by dipping it in the molten metal, and also to eliminate hydrogen mechanically together with the prevention of the generation of an oxide film of molten metal to intercept the contact of the surface of the molten metal with the atmosphere, which is formed by the contact of gaseous material with the surface of the molten metal. Furthermore, another object of this invention is to decompose the oxide film by the contact of ions with molten metal preventing the diffusion into the oxide layer. These procedures keep the molten metal normal for long hours.

As the oxide and gas impurities are absorbed with low energy, the interface of oxide and gas is easily decomposed by the impact with piled filtering material.

As for the place of piling the filtering material, it is recommended to provide a filtering bay in the vessel. The structure of the filtering bay is composed of a vessel which piles and accomodates the filtering material of this invention and has porous holes through which the molten metal can be passed, a buffer plate and a cylinder form a sieve.

DETAILED DESCRIPTION

Example 5

Figure 1:
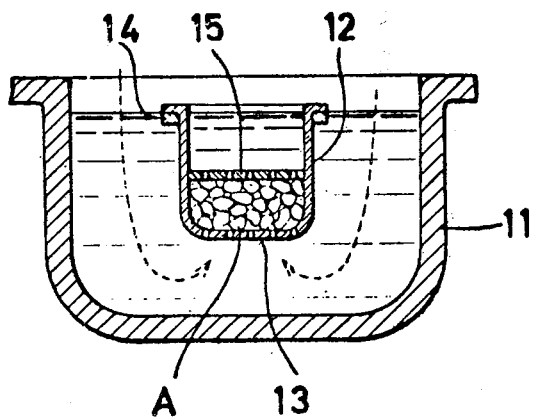
FIG. 1 shows a vertical section of Example 5 of this invention.

In a melting vessel 11 as shown in FIG. 1, a flanged open vessel 12 which is made of graphite or ceramic is floated when the material has a heavier specific gravity than the molten metal, by a float ring or an air vessel 14 of asbestos and by a floating force when the material has a lighter specific gravity than the one of molten metal.

The part 13 designates a porous bottom wall of vessel 12 and a porous cover plate 15 closes the vessel which contains filtering material A piled upon the bottom plate. Molten metal passes the porous bottom plate and is purified by the filtering material A and pumped up from the flanged open mouth of the vessel 12 passing the porous cover plate 15.

The vessel 12 can be fixed with a support or a supporting tool.

Example 6

Figure 2:
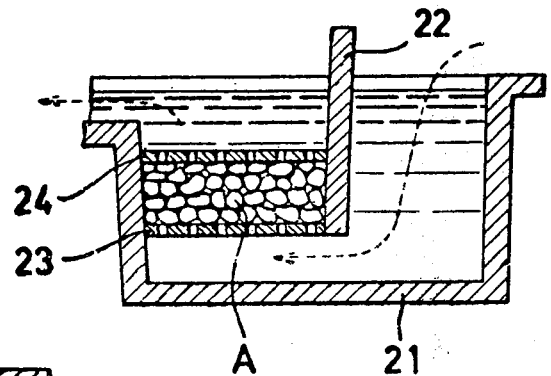
FIG. 2 shows a vertical section of Example 6 of this invention.

In a melting vessel 21 as shown in FIG. 2, a buffer plate 22 which is composed of graphite, ceramics or metal, a porous bottom plate 23 and an upper plate 24 are installed, and the filtering material A is piled on the bottom plate and closed by the upper plate 24. Molten metal passes the porous bottom plate 23 combined with the buffer plate and is purified by the filtering material and then pumped up passing the porous upper plate 24.

Example 7

Figure 3:
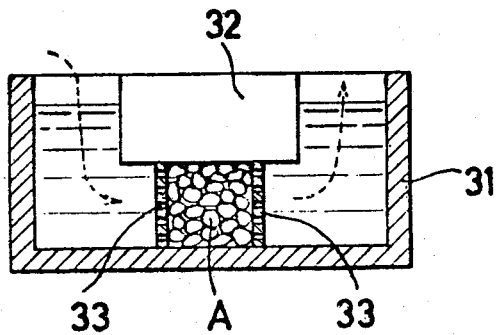
FIG. 3 shows a vertical section of Example 7 of this invention.

In the melting vessel 31 shown in FIG. 3, a vessel 32 made of ceramic and a pair of porous walls 33 connected with the vessel 32 below and separated a definite distance form a room having a definite volume in which the filtering material A is packed. The side wall 33 can be a box such as a cylinder. Molten metal passes the porous front side wall and is purified by the filtering material A and then pumped up passing the porous back side wall.

Example 8

Figure 4:
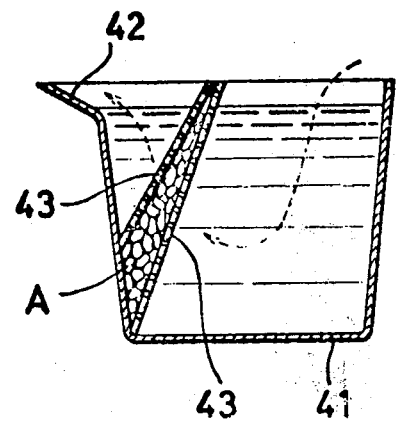
FIG. 4 shows a vertical section of Example 8 of this invention.

To the melting vessel 41 shown in FIG. 4, a takeout mouth 42, a porous wall 43 are installed. The filtering material A is packed in the room formed by the porous walls 43 placed at a definite distance. Molten metal passes the porous wall below and is purified by the packed filtering material A and pumped up by the take-out mouth 42 passing the upper porous wall.

Example 9

Figure 5:
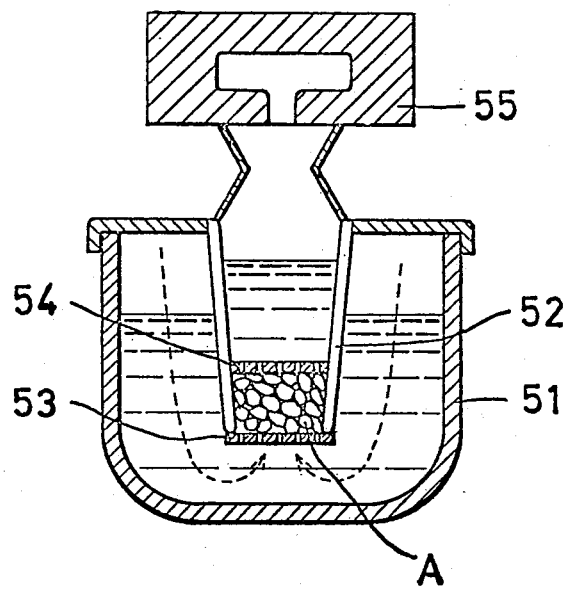
FIG. 5 shows a vertical section of Example 9 of this invention.
Figure 6:
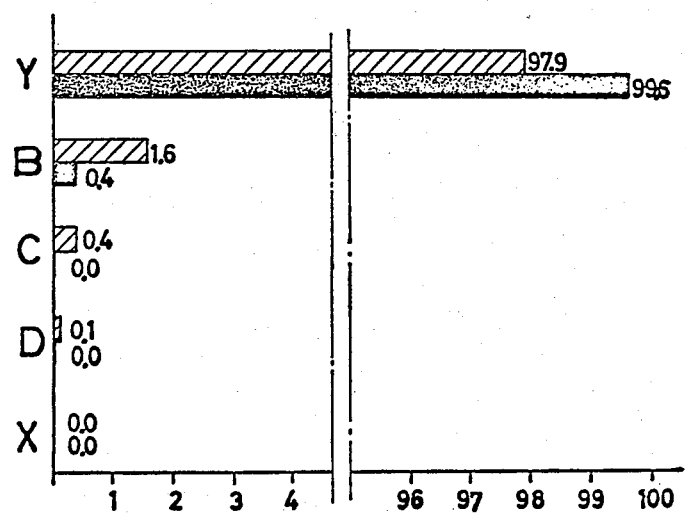
FIG. 6 shows a graph useful in this invention.

In a sealed low pressure molding metal vessel 51 as shown in FIG. 5, the lower part of a low pressure molding tube 52 is packed with the filtering material A and installed with a porous plate 53, and a porous cover 54 upon the piled filtering material A.

The porous bottom plate and cover plate can be installed in the upper part of the tube, and also an attached structure can be placed underneath of the bottom part. Molten metal passes the porous bottom plate and is purified by the filtering material A and injected under pressure from the tube to cast 55 passing the porous cover plate 54.

Aluminum AC 4B (Japan Aluminum Casting Standard) is molded using a low pressure casting tube made of graphite according to FIG. 5 and under conditions of the cylinder head of 0.5 kg air pressure, and a time of 10 to 20 seconds. About 2000 pieces of ingot were cast during 80 hours of continuous operation and checked, resulting in one defective sample in processing.

In this test, blowing phenomenon with flux, mixing of the oxidation product and creases by the mixing of oxide film are hardly observed.

Instead of compressed air inert gases can also be used.

The effect obtained by the parification procedure based on the above mentioned examples are described with regard to molten aluminum and a molten aluminum alloy.

The filtering materials used in the aforementioned examples have the following compositions:

| Ingredient | Content (%) based on the mixture weight |
| --- | --- |
| Calcium fluoride | 10 – 40 |
| Borax | 5 – 15 |
| Magnesium fluoride | 30 – 60 |
| Man-made cryolite | 5 – 15 |
| Lithium carbonate | 5 – 15 |
| Potassium fluoride | 5 – 20 |
| Sodium chloride | 5 – 20 |

A mixture of the above mentioned composition is heated to about 1200°C with agitation to melt homogeneously and then this molten mixture is fed into a graphite mold. The micro-structure of the molded goods obtained are homogeneous and the phenomenon of segregation is not apparent. These cast materials are active in molten aluminum and impurities, and absorb and remove the impurities by their wetting properties.

Furthermore, a trace amount of fluorine and chlorine gases continuously produced eliminates mechanically the gases such as hydrogen contained in molten metal and decomposed the oxide film generated on the surface of the molten metal producing a soft and thin compound and prevent the oxidation of molten aluminum together with the prevention of the diffusion of gases such as hydrogen. Even in the case where said filtering material consists of a molding of a kind of metallic salt, it shows similar behaviors in molten metals and exerts its purifying effect upon the molten metals.

Next, the oxidation products included in the molten aluminum purified with the filtering material of this invention and one not purified are quantitatively analyzed. About 500 kg of aluminum 1S wire waste is melted gradually for 110 hours in a graphite crucible and test pieces are sampled in every 10 hours by a graphite form. An untreated sample means one unpurified in molten state.

Analysis Table 1

| Sample Time | $Al_2O_3$ (%) | |
| --- | --- | --- |
| | *Untreated Sample (%) | Purified Sample (%) |
| Immediately after | 0.0010 | 0.0005 |
| After 10 hours | 0.0015 | 0.0008 |
| After 40 hours | 0.0015 | 0.0008 |
| After 80 hours | 0.0015 | 0.0012 |

*Untreated Sample: Test made without use of the filtering material
Purified Sample: Test made with use of the filtering material The filtering medium used 100 hours in Analysis Table 1 is crushed to half dimension and reused. The effect of filtering material to the aluminum alloy are tested and checked for the harmful effect of the filtering material to metal.

Analysis Table 2

| Sample Time | $Al_2O_3$ (%) | |
| --- | --- | --- |
| | Untreated Sample (%) | Purified Sample (%) |
| Immediately after | 0.0016 | 0.0007 |
| After 10 hours | 0.0016 | 0.0010 |

Analysis Table 3

| (1) Material: 1S Wire Waste | | | | | |
| --- | --- | --- | --- | --- | --- |
| Time | Analysis Value | Si(%) | Fe(%) | Cu(%) | Mg(%) |
| Before the treatment | | 0.59 | 0.62 | 0.13 | 0.77 |
| Immediately after the treatment | | 0.86 | 0.61 | 0.14 | 0.34 |
| After 30 hours | | 0.57 | 0.62 | 0.13 | 0.31 |

| (2) Material: Al-Si 11% Alloy | | | | | | |
| --- | --- | --- | --- | --- | --- | --- |
| Time | Analysis Value | Si(%) | Fe(%) | Cu(%) | Mg(%) | Ca(%) | Na(%) |
| Before the treatment | 10.98 | 0.69 | 2.50 | 0.12 | 0.002 | 0.001 |
| After the treatment | 10.99 | 0.69 | 2.60 | 0.13 | 0.003 | 0.001 |

Al-Si 11% alloy of material (2) in Analysis Table 3 is purified twice according to the purification method of Example 5 and die-cast and 2290 finished pieces are used for a cover case for an automobile. Only one piece of defective product was observed comparing the 0.4–1% defect ratio used in conventional gas blowing or fluxing. The method by this invention reduces the defect ratio to less than 0.0004%. When the return material coated with oil-cake or alumite treated is used, the molten metal is recommended to be purified according to this invention to obtain normal molten metal with less slag and to increase product yield.

Furthermore, 63S billets were cast by a conventional gas blowing method using the purification procedure described in Example 6 of this invention during about 2 months. The results are shown in Graph 1. Cast pieces are tested by an ultrasonic testing method with the conditions of 0.6 of pulse, 5.0 of sensitivity, and the results are ranked Y.B.C.D. for pass, X for fail.

In the graph, the upper hatched line is by the gas blowing method, and the lower gray line is by the Example 6 of this invention.

When plates and wires such as once-drawn wires are continuously casted, the yield is improved to 100 percent/Y-rank and it is clear that the improvement and stabilization of the quality are attributed to this invention.

Small amounts of the samples of the filter material collected in every 10 hours for the samples for Analysis Tables 1 and 2 are also qualitatively analyzed by spectrophotometry and quantitatively by chemical method and showed in Analysis Tables 4 and 5.

Analysis Table 4

Qualitative Analysis by Spectrophotometry of the Filter Material (about main components only)

| Component | time before treatment | After treatment (hrs.) | | | | | | | | | |
|---|---|---|---|---|---|---|---|---|---|---|---|
| | | 10 | 20 | 30 | 40 | 50 | 60 | 70 | 80 | 90 | 100 |
| Mg 2795 | +4 | +4 | +4 | +4 | +4 | +4 | +4 | +4 | +4 | +4 | +4 |
| Na 3302 | +3 | +2 | +3 | +3 | +2 | +3 | +3 | +3 | +3 | +3 | +3 |
| Ag 3382 | +2 | +2 | +2 | +2 | +2 | +2 | +2 | +2 | +2 | +2 | +2 |
| Ca 3933 | +5 | +5 | +5 | +5 | +5 | +5 | +5 | +5 | +5 | +5 | +5 |
| Al 3961 | +3 | +3 | +4 | +4 | +3 | +5 | +5 | +5 | +5 | +5 | +5 |
| Mn 4034 | +2 | +2 | +2 | +2 | +2 | +2 | +2 | +2 | +2 | +2 | +2 |

Analysis Table 5

Quantitative Chemical Analysis (the methods of determination are abbreviated)

| Hour | Ca (%) | Mg (%) | Ba (%) |
|---|---|---|---|
| Before treatment | 10.34 | 14.41 | 12.17 |
| After 10 hours | 10.06 | 17.22 | 11.61 |
| After 60 hours | 7.42 | 16.96 | 11.61 |
| After 100 hours | 11.68 | 17.06 | 10.23 |

From Analysis Tables 4 and 5 and X-ray diffraction, it is clear that the filter materials have no structural change. The weight of the filter materials are determined every hour. The weight loss is 0.3 to 0.5% per hour until 60 hours and then the weight loss decreases gradually and at 100 hours, no weight loss is observed. The weight loss is caused by the release of the gas product.

I claim:

1. A method of preparing a filter medium for the filtration of molten aluminum or a molten aluminum alloy comprising the steps of using more than two halogenide compounds, of which at least one halogenide is selected from the group consisting of compounds of sodium fluoride, potassium chloride, silver chloride, potassium fluoride and sodium nitrate, and of which the second halogenide is selected from the group of compounds having a melting point of more than 1000°C consisting of calcium fluoride, magnesium fluoride, aluminum fluoride, barium chloride, cryolite, and cerium fluoride and mixtures thereof; heating said compounds until they are molten and then mixing thoroughly with some agitation to obtain a homogeneous melt and subjecting the thus obtained melt to a molding step.

2. The method as claimed in claim 1, wherein the filter medium is admixed with at least one halogenide compound having a metal ingredient selected from the group consisting of calcium ion, sodium ion, and lithium ion which have the property to produce hydrogen compounds.

3. The method as claimed in claim 1, wherein there is added to the filter medium one or more than one compounds selected from the group consisting of carbon, nitrogen, boron, and silicon containing compounds.

4. The method as claimed in claim 2, wherein there is added to the filter medium one or more than one compounds selected from the group consistings of carbon, nitrogen, boron, and silicon containing compounds.

5. The method as claimed in claim 1, wherein there is added to the filter medium at least one fire-resistant material selected from the group consisting of ceramics, glass wool, and carbon fiber.

6. The method as claimed in claim 2, wherein there is added to the filter medium at least one fire-resistant material selected from the group consisting of ceramics, glass wool, and carbon fiber.

7. The method as claimed in claim 3, wherein there is added to the filter medium at least one fire-resistant material selected from the group consisting of ceramics, glass wool, and carbon fiber.

8. The method as claimed in claim 1, including the step of admixing metal powder, or metal lump, of which the melting point is higher than the aluminum melting point before the melting step.

9. The method as claimed in claim 2, including the step of admixing metal powder, or metal lump, of which the melting point is higher than the aluminum melting point before the melting step.

10. The method as claimed in claim 3, including the step of admixing metal powder, or meal lump, of which the melting point is higher than the aluminum melting point before the melting step.

11. The method as claimed in claim 5, including the step of admixing the metal powder, or metal lump, of which the melting point is higher than the aluminum melting point before the melting step.

* * * * *